Sept. 7, 1937.  H. J. HASBROUCK, JR., ET AL  2,092,159
ROLLER AND FLYWHEEL MOUNT
Filed June 28, 1935
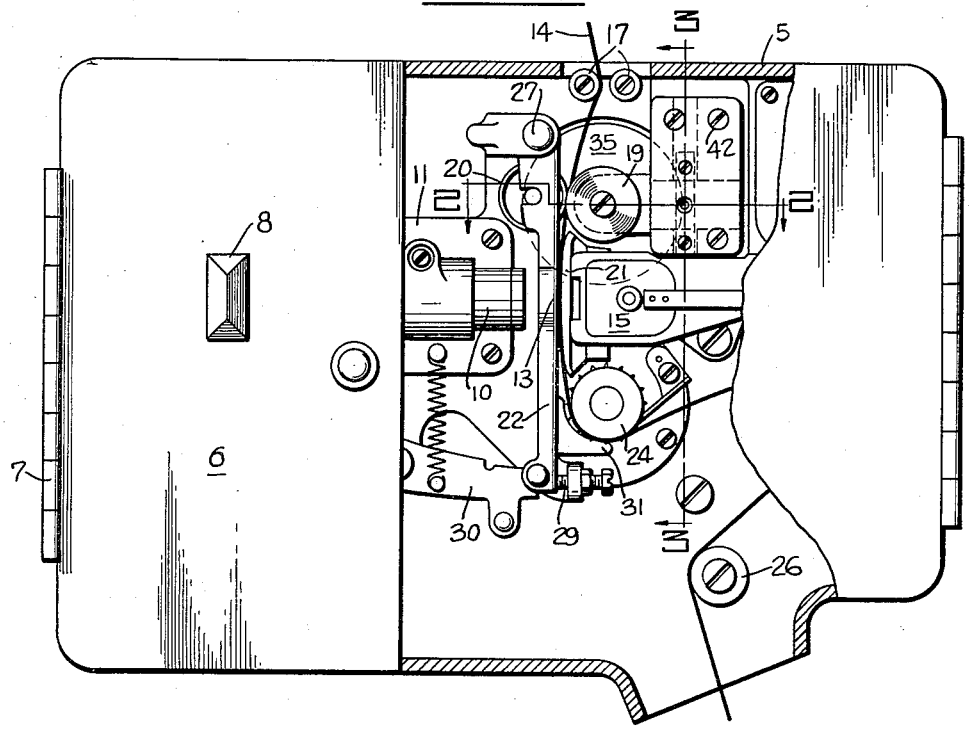
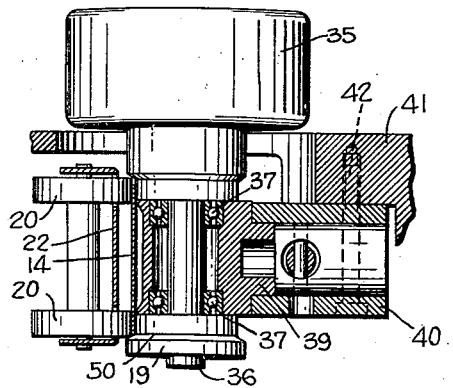
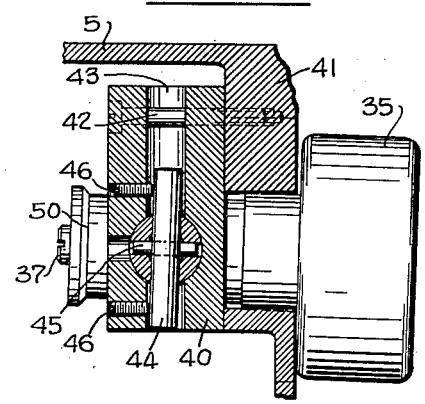
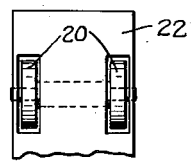
INVENTORS
Harold J. Hasbrouck, Jr.
Ernest Ross
BY
ATTORNEY Patented Sept. 7, 1937

2,092,159

UNITED STATES PATENT OFFICE 2,092,159

ROLLER AND FLYWHEEL MOUNT

Harold J. Hasbrouck, Jr., Flushing, and Ernest Ross, Elmhurst, N. Y., assignors to United Research Corporation, Long Island City, N. Y., a corporation of Delaware Application June 28, 1935, Serial No. 28,847

5 Claims. (Cl. 179—100.3)

This invention relates to talking motion picture apparatus and particularly to a mounting for a roller and flywheel assembly. The principal object of the invention is to facilitate the advancing and guiding of talking motion picture film past a translation point in a reproducing or recording unit where a constant speed of advancement is desired.

In talking motion picture film recording systems, sound is recorded on a longitudinal strip occupying a narrow portion of the film intermediate the picture frames and a row of perforations, as is well known in the art. In the recording and reproduction of a record of this type, it is necessary in order to obtain perfect recording and reproduction that the film be advanced past the translation point at a constant speed and that the sound record portion maintain a constant position with respect to the modulated light beam. In other words, weaving of the film is a deleterious factor and the present invention prevents weaving by guiding the film adjacent the translation point while advancing it at a substantially constant speed.

The object of the invention is accomplished by utilizing the basic method disclosed and claimed in copending application Serial No. 28,648 filed June 23, 1935. The disclosure of this co-pending application relates to the guiding of the film by producing a component of force transversely of the film for maintaining one edge thereof against a guide which may be stationary, or rotatable such as a flange on a roller. The mechanism disclosed therein was a pad roller whose axis was positioned abaxially of its cooperating guide roller axis and thus produced a drag on the film as the film passed under it. The present invention is directed to means for mounting the guide roller abaxially with respect to its cooperating pad or spring pressed roller, the guide roller being stabilized by a flywheel rotatable therewith. Means for adjusting the abaxiality of the roller is also provided to vary the guiding force.

The invention will be more fully understood by reference to the following description read in conjunction with the accompanying drawing, in which Fig. 1 is an elevational view of a sound reproducing unit embodying the invention.

Fig. 2 is a partial sectional view of the roller and mount of Fig. 1 taken along the line 2—2.

Fig. 3 is a partial sectional view of the roller and mount of Fig. 1 taken along the line 3—3; and Fig. 4 is a detail view of the spring pressed rollers which cooperate with the flywheel roller.

Referring to Fig. 1, the sound reproducing unit includes a casing 5 having a cover 6 hinged at 7 with a window 8 for viewing a constant intensity lamp positioned directly behind it. The light from the lamp is transmitted through an optical assembly 10 supported by a mount 11, this mount being disclosed and claimed in co-pending application Serial No. 24,832 filed June 4, 1935. The light emerging from the lens unit 10 is impressed upon the film at a translation point 13 where it is modulated by the sound track on a film 14 and then impressed upon a light sensitive cell enclosed in a holder 15, this holder being disclosed and claimed in U. S. Patent No. 2,031,646 of Feb. 25, 1936. The film 14 may come directly from a supply reel (not shown) or from a picture projection unit (not shown). The film passes into the sound reproducing unit between rollers 17, then between a flywheel roller 19 and spring pressed rollers 20, then between a gate shoe 21 and the tensioning springs of a gate 22, around a drive sprocket 24, over a roller (not shown), and then over roller 26 to a take up reel (not shown).

The gate 22 is pivoted at a point 27 and is held tightly against a screw stop 29 by a spring tensioned lever 30. The gate has mounted thereon, in addition to the rollers 20, guide shoe elements 31. For details of this gate assembly reference is made to co-pending application Serial No. 28,846, filed June 28, 1935 where it is disclosed and claimed.

Referring now to the detail drawing, a flywheel 35 is shown mounted upon a shaft 36 adapted to be rotated integrally with the roller 19 upon ball bearings 37. The bearings 37 are mounted on a cylindrical bracket 39 extending into a mounting block support 40 attached to a boss 41 on the rear wall of casing 5 by screws 42. Positioned in an oversized aperture 43 in the block 40 is a pin 44 maintained therein by a dowel pin 45 and adjustable to the extent of the aperture by set screws 46. As shown in Figs. 2 and 3, the bracket 39 is pierced by pins 44 and 45 within holder 40 and any adjustment of the pin 44 by the set screws 46 tilts the axis of rotation of the roller and flywheel assembly in a vertical plane.

This tilt is made such that it tends to provide a component of force which urges the film toward the flange 50 of the roller 19, and thus keeps the sound track portion of the film at a fixed position with respect to the translation point 13 as it passes between the shoe 21 and gate 22. It is to be noted in Fig. 4 that the axis of the spring pressed rollers 20 is normal to the direction of movement of the film and consequently the rollers function to hold the film against the flywheel roller at a uniform pressure.

This means of guiding film and controlling the velocity thereof is efficient and stable and simplifies the driving mechanism. The friction which naturally exists due to the "scrubbing" action is insufficient to cause undue abrasion of the film.

What is claimed is:

1. An adjustable mount for a guide roller comprising a shaft for said roller, bearings for said shaft, a cylindrical member adapted to support said bearings, a mounting adapted to receive said cylindrical support and maintain it in a fixed axial position, said block having an aperture therein perpendicular to said cylindrical support, a pin in said block aperture passing through said cylindrical support, a second pin passing through said cylindrical support and said first pin, and means for adjusting the position of said first pin within said block aperture, the position of said first pin determining the axial position of said roller shaft.

2. An adjustable mount for a guide roller adapted to guide film comprising a roller having a shaft, bearings for said shaft, a cylindrical support having said bearings mounted at one end thereof, a mounting in which said support is adapted to rotate, said mounting having an aperture therein containing a pin passing through said support, said pin extending beyond the extremities of said support, and a pair of set screws bearing against each end of said pin for rotating said support within said mounting.

3. An adjustable mount for a guide roller adapted to guide film comprising a shaft for said roller, bearings for said shaft, a cylindrical support having said bearings mounted adjacent one end thereof, a mounting block in which said cylindrical support may rotate for varying the axial position of said shaft, and means contained within said mounting block and externally accessible for rotating said cylindrical support and for maintaining said support in an adjusted position.

4. An adjustable mount for a guide roller adapted to guide film past a translation point comprising a shaft for said roller, bearings on which said shaft is adapted to rotate, a cylindrical support having said bearings mounted on one end thereof, a supporting block adapted to accommodate said cylindrical bearing support, said cylindrical bearing support having an aperture the other end thereof, a pin of smaller diameter than said aperture adapted to lock said cylindrical bearing support in said block, said block having an aperture therethrough, and a pin in said block aperture passing through said bearing support for tilting the shaft of said roller.

5. A mounting for a flywheel and integrally associated guide roller adapted to feed film past a translation point at a substantially constant speed, comprising a shaft on which said roller and flywheel are adapted to rotate, bearings for said shaft, a cylindrical support having said bearings mounted at the end thereof, a block having an aperture adapted to accommodate said bearing support and maintain the same in a fixed axial position, an aperture in said block normal to said support aperture, a pin within and smaller than said normal aperture and passing through said support for locking said cylindrical support to said block, and means for varying the position of said pin in said aperture for tilting the shaft of said flywheel and roller.

HAROLD J. HASBROUCK, Jr.
ERNEST ROSS.